United States Patent [19]

Yang

[11] Patent Number: 5,044,685
[45] Date of Patent: Sep. 3, 1991

[54] SUN VISOR SYSTEM

[76] Inventor: Pai-Sung Yang, 2716 7th Street, Santa Monica, Calif. 90405

[21] Appl. No.: 584,252

[22] Filed: Sep. 18, 1990

Related U.S. Application Data

[63] Continuation-in-part of Ser. No. 466,862, Jan. 18, 1990, abandoned, which is a continuation-in-part of Ser. No. 423,059, Oct. 18, 1989, abandoned.

[51] Int. Cl.[5] .............................. B60J 3/02; B60J 3/00
[52] U.S. Cl. .................................. 296/97.6; 296/97.7; 296/97.8; 296/97.9
[58] Field of Search ................... 296/97.1, 97.5, 97.6, 296/97.7, 97.8, 97.9, 97.11

[56] References Cited

U.S. PATENT DOCUMENTS

| | | | |
|---|---|---|---|
| 2,122,120 | 6/1938 | Thope | 296/97.4 |
| 2,305,677 | 12/1942 | Cotton | 296/97.8 |
| 2,603,530 | 7/1952 | Jones | 296/97.6 |
| 2,813,749 | 11/1957 | Wetig | 296/97.7 |
| 2,962,721 | 12/1960 | Espy | 296/97.7 X |
| 3,206,244 | 9/1965 | Kurvink | 296/97.6 |
| 3,369,837 | 2/1968 | Metier | 296/97.6 |
| 3,410,602 | 11/1968 | Schüler | 296/97.6 |
| 4,023,855 | 5/1977 | Janata et al. | 296/97.6 |
| 4,248,474 | 2/1981 | Mandrick | 296/97.6 |
| 4,317,589 | 3/1982 | Kuss | 296/97.6 |
| 4,353,593 | 10/1982 | Henson | 296/97.6 |
| 4,861,091 | 8/1989 | Wallen | 296/97.6 |

FOREIGN PATENT DOCUMENTS

| | | | |
|---|---|---|---|
| 255915 | 7/1967 | Austria | 296/97.6 |
| 1503851 | 12/1967 | France | 296/97.6 |
| 2111447 | 7/1983 | United Kingdom | 296/97.6 |
| 2156294 | 10/1985 | United Kingdom | 296/97.6 |

Primary Examiner—Margaret A. Focarino
Assistant Examiner—Andrew C. Pike
Attorney, Agent, or Firm—Allan M. Shapiro

[57] ABSTRACT

A sun visor system allows light incoming to a vehicle interior to be deflected and obstructed by a lightweight and easily manipulable flat shield. The flat shield is removably attachable to several interior supports including: the main visors of the vehicle, the dashboard, and upper surfaces. Removable attachments include magnets on metal and hook-and-loop fasteners. V-shaped bendable plates are included in the system to provide connective support for a flat shield when, without the V-shaped bendable plate, such connective support would be absent.

12 Claims, 1 Drawing Sheet

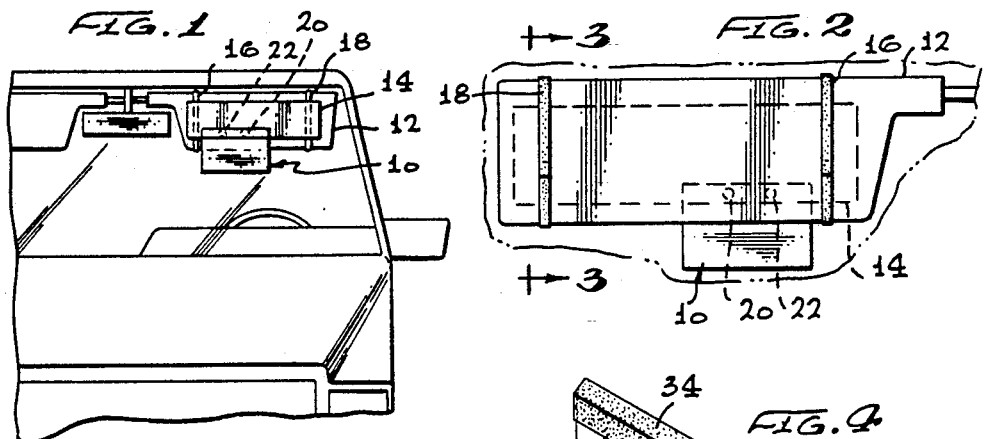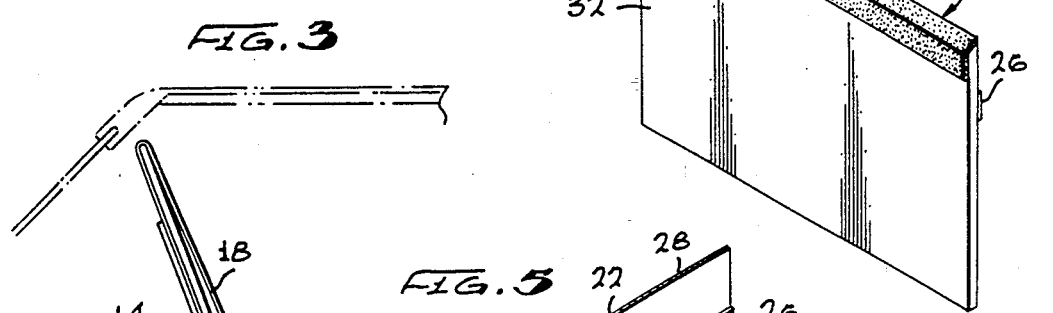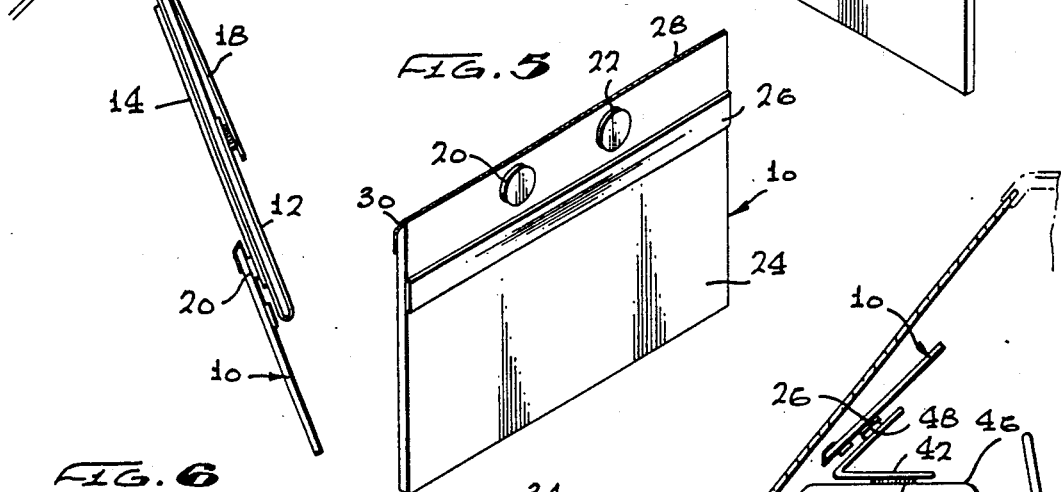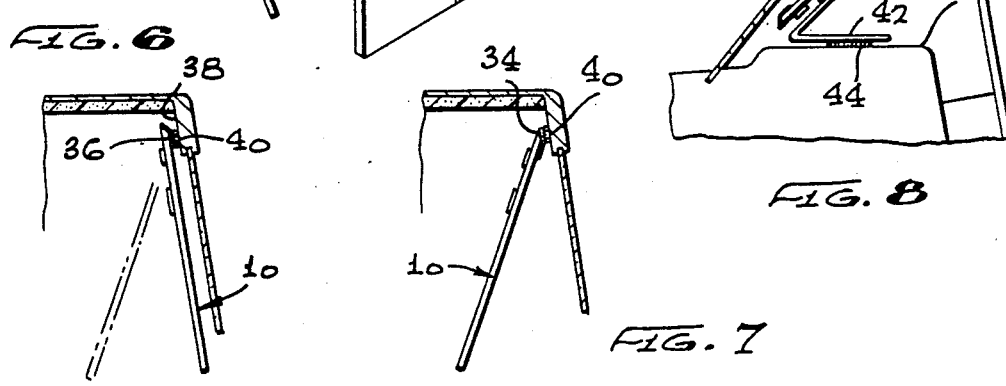

SUN VISOR SYSTEM

CROSS-REFERENCES TO RELATED APPLICATIONS

This application is a continuation-in-part of U.S. patent application Ser. No. 07/466,862, filed on Jan. 18, 1990, now abandoned, entitled ATTACHABLE SUN VISOR by the same inventor, which is a continuation-in-part of U.S. patent application Ser. No. 7/423,059, filed Oct. 18, 1989, now abandoned.

BACKGROUND OF THE INVENTION

1. Field of the Invention

This invention relates to vehicular. sun visors, and more particularly to a sun visor system for vehicles.

2. Description of the Prior Art

Sun visors are well known in the art. However, as will be seen in the following descriptions, such prior art does not anticipate a sun visor system as disclosed herein, due to the advancements in the art made by same.

U.S Pat. No. 4,635,995 discloses an attachable sun visor that uses a U-shaped clamping device. This patent discloses an attachable sun visor that blocks incoming sunlight from the windshield, but must be attached to a generally smooth main sun visor.

U.S. Pat. No. 4,058,340 discloses a retainer for a sun visor extension. The retainer is difficult to attach to a main sun visor that is not smooth.

U.S. Pat. No. 4,623,188 discloses a height adjustable sun visor that is limited to vertical motion.

U.S Pat. No. 3,649,068 discloses an adjustable sleeve for a sun visor that is limited to horizontal motion.

U.S. Pat. No. 4,666,205 discloses an auxiliary sun visor that is mounted to the upper surface of a vehicle. As this sun visor is designed to be mounted permanently, it is difficult to remove or dismount.

U.S. Pat. No. 4,005,899 discloses an anti-glare shield for vehicles used to block reflected sunlight from the front part of the vehicle. The anti-glare shield must be supported on a generally horizontal dashboard.

A patent application for a sun visor system was filed by the same inventor as the sun visor system disclosed herein on Oct. 18, 1989, application Ser. No. 07/423,059, now abandoned. That previous application disclosed an attachable sun visor that could not block light incoming from a side window or reflected off the vehicle hood.

All of the aforementioned U.S. patents have some bearing on the art of blocking o deflecting light incoming to the interior of a vehicle. However, none of them directly address the crucial elements of removability and adjustability without distraction while offering a large number of places for sun visor affixation. The sun visor disclosed and claimed herein addresses these omissions while also allowing such features without great expense.

In conclusion, whatever the precise merits, features, and advantages of the above cited references, none of them achieves or fulfills the purposes of the sun visor system of the current invention.

SUMMARY OF THE INVENTION

In order to aid in the understanding of this invention, it can be stated in essentially summary form that it is directed to a system for deflecting or obstructing light incoming to the interior portion of a vehicle that would ordinarily distract, irritate, or annoy the driver thereof. The system comprises: a flat shield that is easy to handle and use, the shield having plural means of attachment to different types of supports; a V-shaped bendable plate to which the flat shield may be removably attached; and a flat plate that is attached to a vehicle's main sun visor and to which the flat shield may be removably attached. Several similar components may by placed throughout the interior of the vehicle for removable attachment of a flat shield in order to block or deflect light.

Accordingly, it is an object of this invention to provide for a sun visor system that is removably attachable to various interior vehicle portions in order to control the path of incoming direct or reflected light.

It is another object of this invention to provide a sun visor system that circumvents use of main sun visors that would have a tendency to block a driver's view.

It is another object of this invention to provide a sun visor system that is easy to use.

It is an object of this invention to provide a sun visor system to block light incoming to a passenger section of a vehicle.

It is an object of this invention to provide a sun visor system that is easily mounted without the use of tools.

It is an object of this invention to provide a sun visor system that is easily adjusted.

It is an object of this invention to provide a sun visor system that is compact and easily stored.

It is an object of this invention to provide a sun visor system that is inexpensive and easy to make.

The features of the present invention which are believed to be novel are set forth with particularity in the appended claims. The present invention, both as to its organization and manner of operation, and together with further objects and advantages thereof, may be understood best by reference to the following description taken in connection with the accompanying drawings.

BRIEF DESCRIPTION OF THE DRAWINGS

FIG. 1 is a front view looking rearward from the outside of a vehicle showing a removably attachable sun visor of the system affixed to a main sun visor by means of a flat plate.

FIG. 2 is an interior, driver's-side view looking forward of a main sun visor with a removably attachable sun visor of the system affixed thereto.

FIG. 3 is a side perspective view of the removably attachable sun visor system in FIG. 1.

FIG. 4 is a perspective view of one side of a removably attachable sun visor of the system, showing tiny hooks for attachment to loops or fabric along the top portion thereof.

FIG. 5 is a perspective view of another side of the removably attachable sun visor of the system showing two magnetic disks and a metal bar.

FIG. 6 is side view of a removably attachable sun visor of the system affixed to an upper surface and deflecting light incoming from a side window.

FIG. 7 is an alternative placement of a removably attachable sun visor of the system as shown in FIG. 6 by shadow lines.

FIG. 8 is a side view of a removably attachable sun visor of the system affixed to a V-shaped bendable plate which is removably attached to the dashboard of a vehicle.

DETAILED DESCRIPTION OF THE PREFERRED EMBODIMENTS

Main sun visors frequently fail to block direct or reflected sunlight when it shines through a vehicle's window, especially in the early morning or late afternoon when the sun is low on the horizon. Such sun visors also do not block light from oncoming vehicles at night or light reflected from an exterior surface such as the vehicle hood.

The invention herein disclosed uses magnets or, alternatively, hooks and loops, to removably attach an accessory sun visor in the form of a shield to several interior portions of a vehicle. These portions, and the purposes therefor, are as follows:

the main sun visor within a vehicle for the purpose of blocking light from the windshield or the reflection of sunlight from the hood or elsewhere;

upper inner surfaces of a vehicle for blocking light incoming from a side window;

the dashboard of a vehicle for blocking direct or reflected light; and other removably attachable sun visors for blocking direct or reflected light or for dimming incoming light from an exterior source.

The attachable sun visor herein disclosed is smaller than a main sun visor present in most vehicles. This makes it easy to place and use where it is most needed.

When the sun is low on the horizon and the main sun visor is lowered enough to block the sunlight, the size and location of the main visor are such that the driver's view of traffic and the adjacent area also may be blocked, creating a hazardous situation. Sunglasses worn by the driver do not completely remedy this situation because the sunglasses, while dimming the sunlight, also dim the light reflected off road signs. Dim road signs may distract the driver while he attempts to ascertain the information conveyed by such signs as he strains to read them.

These conditions may be remedied by the sun visor system disclosed herein. An opaque or translucent shield removably attached to a main sun visor aids the driver without blocking his view as the shield can be positioned easily for best sun blocking and road viewing.

When the sun shines too harshly through a side window, pivoting a main sun visor may dangerously distract a driver. Removably mounting a sun visor of the present invention to an upper surface remedies this distraction as the sun visor disclosed herein needs merely to be placed in a position where it may attach to a support and block the sun.

Reflected sunlight from a vehicle hood can be a blinding distraction to a driver. A main sun visor is incapable of blocking such sunlight. When the sun visor system of this invention is used by removably attaching a sun visor to the dashboard, the driver's eyes are then shielded from light reflected off the vehicle's hood.

As shown in FIGS. 1, 4, and 5, a flat shield, indicated generally at 10, is provided for use throughout the sun visor system of the present invention. In FIG. 1, the shield 10 is removably attached to a vehicle's main sun visor 12. The removably attachable sun visor system as shown in FIG. 1 consists of the flat shield 10 and a flat metal plate 14. Plate 14 is secured to straps 16 and 18 which are looped about the main sun visor 12 to hold plate 14 in place on the windshield-facing side of main visor 12. Plate 14 is magnetically attractable. The flat shield 10 is of a suitable geometric shape for blocking the sun. The shield 10 may be opaque, translucent, or both in combination with a portion that is transparent. The flat shield 10 is provided with a pair of magnets 20 and 22 on a front surface 24 for removable attachment to the metal plate 14.

Further describing the flat shield of FIGS. 4 and 5, it is seen that the front surface 24 also is provided with a flat metallic strip or bar 26 which extends across the entire width of shield 10 and is located near the upper edge 28 but separated therefrom by magnets 20 and 22. Bar 26 is substantially as long as shield 10 is wide to provide maximum utility as will become clear hereinafter. The shield 10 has a geometric shape which preferably is substantially rectangular but also has an upper surface 30 which is angled downwardly and rearwardly from front surface upper edge 28 back to rear surface 32. The hook part, for example, of a hook-and-loop fastener is secured, as one piece, to the shield 10 to provide both portion 34 along angled upper surface 30 and portion 36 adjacent thereto and secured on rear surface 32.

As best seen in FIGS. 1, 2, and 3, the shield 10 may be adjusted in position easily in all directions by sliding it with respect to metallic plate 14, without disengaging the magnets 20 and 22 from the plate 14.

Instead of using straps 16 and 18, the flat plate 14 may be glued or clamped to the main sun visor 12. If the main sun visor 12 is made of metal or covered by a cloth that can hold the shield 10 by its fastener strip 36, then the flat plate 14 may be omitted.

If the shield 10 is made of metal or is covered by a cloth that can hold another shield 10 by its fastener strip 36, then another shield 10 may be attached to the first shield 10 which in turn may be connected to a main sun visor 12 or other support.

The flat shield 10 may also be attached to an upper surface 38 within the interior of the vehicle as shown in FIGS. 6 and 7. The other part of the hook-and-loop fastener 40 is secured to the upper surface 38, as by a pressure-sensitive adhesive backing, and fastener strip 36 (FIG. 6) or fastener strip 34 (FIG. 7) is attached thereto, as desired, so that a driver can easily and without distraction place the flat shield 10 in a position that best deflects irritating incoming light without blocking his view. It now should be clear that the angled edge 30 and the fastener strips 34 and 36 allow a driver different angles of placement for the flat shield 10 against a fabric. This facilitates placement of the flat shield 10 where it is most useful in blocking light without blocking vision.

As seen in FIG. 8, a V-shaped bendable plate 42 is attached by a hook-and-loop fastener 44 to the dashboard 46 of a vehicle. Such a V-shaped bendable plate 42 may be placed on many interior surfaces within a vehicle but, for teaching purposes, the dashboard 46 serves as a working example.

The V-shaped bendable plate 42 has at least one magnet 48 which is used to hold the flat shield 10 in position where the plate might not otherwise be removably attached. As many dashboards 46 are made of vinyl, there is nothing to which the flat shield 10 could attach. As seen in FIG. 8, the metal bar 26 of the flat shield 10 is held against the V-shaped bendable plate 42 by means of magnet 48. Other alternative attachment means also include intermeshing hooks and loops, or reversal of the magnets-and-bar locations. The flat shield 10 can be adjusted with respect to plate 42 to deflect incoming direct or reflected sunlight.

In conclusion, this invention of a sun visor system blocks or dims incoming direct or reflected light through a windshield or side window and also blocks or dims incoming light reflected from the exterior, all without blocking or diminishing the driver's view to an undue extent. This is accomplished by removably attaching a light diminishing shield 10 to: a main sun visor 12 of the vehicle, an upper surface 38 of the vehicle, the dashboard 46, or another flat shield 10. Sometimes, instead of directly attaching a light diminishing flat shield 10 to a surface, a V-shaped bendable plate 42 is used.

The invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. For use in a motor vehicle, a sun visor system comprising:
   (a) a flat plate attached to a main sun visor of the vehicle;
   (b) at least one bendable one-piece plate attached to a dashboard of the vehicle;
   (c) at least a first one hook-and-loop fastener secured to an upper surface of the vehicle;
   (d) an attachable shield having a geometrical shape, wherein said shield is attachable to any one of said main sun visor of the vehicle, said dashboard of the vehicle, and said upper surface of the vehicle; and
   (e) shield attaching means for attaching said shield to any one of said main sun visor of the vehicle, said bendable plate on said dashboard of the vehicle, and said fastener on said upper surface of the vehicle.

2. The sun visor system of claim 1, further comprising flat plate attaching means for attaching said flat plate to said main sun visor, wherein said flat plate has a geometrical shape.

3. The sun visor system of claim 2, wherein said flat plate attaching means comprises at least one tying means.

4. The sun visor system of claim 2, wherein said flat plate is made of metal, said shield attaching means comprises at least one magnet and said shield is attachable to said flat plate by said magnet.

5. The sun visor system of claim 4, wherein said flat plate is covered by magnetically-permeable cloth.

6. The sun visor system of claim 1, further comprising at least one bendable plate attaching means for said bendable plate for attaching said bendable plate to said dashboard, wherein said bendable plate is V-shaped.

7. The sun visor system of claim 6, wherein said bendable plate attaching means comprises at least one magnet, said shield is attached to said bendable plate, and said bendable plate is bent to a suitable angle for blocking sunlight with said shield.

8. The sun visor system of claim 1, wherein said shield attaching means comprises a metal bar secured to said shield, and said metal bar is attachable to said bendable plate.

9. The sun visor system of claim 1, wherein said shield attaching means comprises at least a second one hook-and-loop fastener, and said second one hook-and-loop fastener is attached to said first one hook-and-loop fastener secured to said upper surface of the vehicle.

10. The sun visor system of claim 9, wherein said upper surface of the vehicle is adjacent a side window of the vehicle so that said shield is adjacent said side window.

11. The sun visor system of claim 1, wherein said shield is transparent.

12. The sun visor system of claim 1, wherein said shield is opaque.

* * * * *